United States Patent [19]
Nelson

[11] 3,969,890
[45] July 20, 1976

[54] HELICOPTER POWER PLANT CONTROL
[75] Inventor: Robert E. Nelson, Indianapolis, Ind.
[73] Assignee: General Motors Corporation, Detroit, Mich.
[22] Filed: July 17, 1974
[21] Appl. No.: 489,262

[52] U.S. Cl................ 60/39.15; 60/39.28 R; 60/39.28 P; 60/224; 235/92 R; 235/150.1; 416/30
[51] Int. Cl.²............................................. F02C 7/02
[58] Field of Search............ 60/224, 39.14, 39.28 R, 60/39.28 P, 39.15, 39.16, 39.29; 235/92; 416/30, 27

[56] References Cited
UNITED STATES PATENTS

| | | | |
|---|---|---|---|
| 2,961,052 | 11/1960 | Smith | 416/30 X |
| 3,100,963 | 8/1963 | Michel | 60/39.28 X |
| 3,174,284 | 3/1965 | McCarthy | 60/39.15 X |
| 3,365,882 | 1/1968 | Greune | 60/39.15 |
| 3,496,562 | 2/1970 | Smith | 235/92 PE |
| 3,600,888 | 8/1971 | Nethken | 60/39.28 R |
| 3,813,063 | 5/1974 | Martin | 60/39.28 R |
| 3,839,860 | 10/1974 | Martin | 60/39.28 R |

*Primary Examiner*—Clarence R. Gordon
*Attorney, Agent, or Firm*—Paul Fitzpatrick

[57] ABSTRACT

A control system for a helicopter power plant with three power units driving the lifting rotor system through a main gearbox. Each power unit comprises a gas turbine engine of the gas-coupled type, a hydromechanical fuel control receiving electrical inputs to set a gas generator governor in the fuel control, an engine electronic control, and various engine accessories.

5 Claims, 11 Drawing Figures

| PARTIAL BEEPER TRUTH TABLE ACTUAL NUMBER OF STEPS=221, STEP SIZE=.06V |||||||||||
|---|---|---|---|---|---|---|---|---|---|---|
| | MSB $D_1$ | $C_1$ | $B_1$ | $A_1$ | $D_2$ | $C_2$ | $B_2$ | LSB $A_2$ | PER CENT EQUIVALENT | BEEPER OUTPUT |
| MIN. LIMIT | 0 | 0 | 0 | 0 | 0 | 0 | 1 | 1 | 90.0 | 10.0V |
| TURN ON SET POINT | 1 | 0 | 1 | 0 | 0 | 0 | 0 | 0 | 100.0 | 0.00V |
| MAX. LIMIT | 1 | 1 | 1 | 0 | 0 | 0 | 0 | 0 | 104.0 | 4.00V |

| PARTIAL BEEPER TRUTH TABLE ACTUAL NUMBER OF STEPS=221, STEP SIZE=.0452V |||||||||||
|---|---|---|---|---|---|---|---|---|---|---|
| | MSB $D_1$ | $C_1$ | $B_1$ | $A_1$ | $D_2$ | $C_2$ | $B_2$ | LSB $A_2$ | PER CENT EQUIV. | BEEPER OUTPUT |
| MIN. LIMIT | 0 | 0 | 0 | 0 | 0 | 0 | 1 | 1 | -1% | -5V |
| TURN ON SET POINT | 0 | 1 | 1 | 1 | 0 | 0 | 0 | 0 | 0 | 0V |
| MAX. LIMIT | 1 | 1 | 1 | 0 | 0 | 0 | 0 | 0 | +1% | +5V |

3,969,890

HELICOPTER POWER PLANT CONTROL

The invention described herein was made in the course of work under a contract with the Department of Defense.

INTRODUCTION

The operation of the power plant is normally controlled by the pilot through condition levers and switches on a control quadrant, through a pitch control by which the collective pitch of the rotor blades is controlled, and through a master beeper switch which is operable to trim the setting of an isochronous governor for the rotor system and the gas generator governors. The condition lever of each engine transmits a speed command signal through the electronic control of each power unit to its gas generator governor. A signal of collective pitch transmitted from the rotor control system to each engine electronic control is another factor in setting the governor.

The power plant includes a power management control, the principal function of which is to equalize the power outputs of the engines. It also includes the rotor isochronous governor. The power management control receives inputs of rotor system speed command and actual rotor speed and of the torques of the individual engines and transmits a governor trim signal to increase or decrease engine power to several electronic controls.

Auxiliary beeper circuits permit limited adjustment of each engine governor by a beeper switch when automatic load sharing is not in effect. The master and auxiliary beeper circuits are of particular interest herein.

All signals are transmitted electrically between the rotor system, control panel, power management control, and engine electronic controls.

This invention relates particularly to controls for a helicopter power plant embodying a plural number of gas turbine engines. However, many features of the control system may be employed in other environments. The system provides an overall control of the operation of the several engines, coordinating the engines with the operation of the lifting rotor or rotors of the aircraft and with signals transmitted by the aircraft pilot. It provides for division of the load between individual engines, for safety overrides or shutdowns in the event of casualty, for alternative modes of operation in the event of failure of some portion of the system, and particularly for electrical transmission of signals between various elements of the system which are located at diverse points in the aircraft. This use of electrical interconnections or "fly-by-wire", as opposed to mechanical rigging or hydraulic controls, for example, reduces weight and increases reliability of the power plant besides facilitating installation.

The principal object of the present invention is to improve controls for a multiple engine installation, particularly in helicopter installations powered by gas turbine engines; a more particular object of the invention is to provide improved speed trim circuits for a power plant which employ electrical "increase" and "decrease" signals to effect progressive resetting of speed governors, the circuits embodying digital and analog elements.

The nature of the invention and its advantages will be apparent from the succeeding detailed description of the preferred embodiment of the invention, the accompanying drawings thereof, and the appended claims.

Referring to the drawings.

Figure 7A:
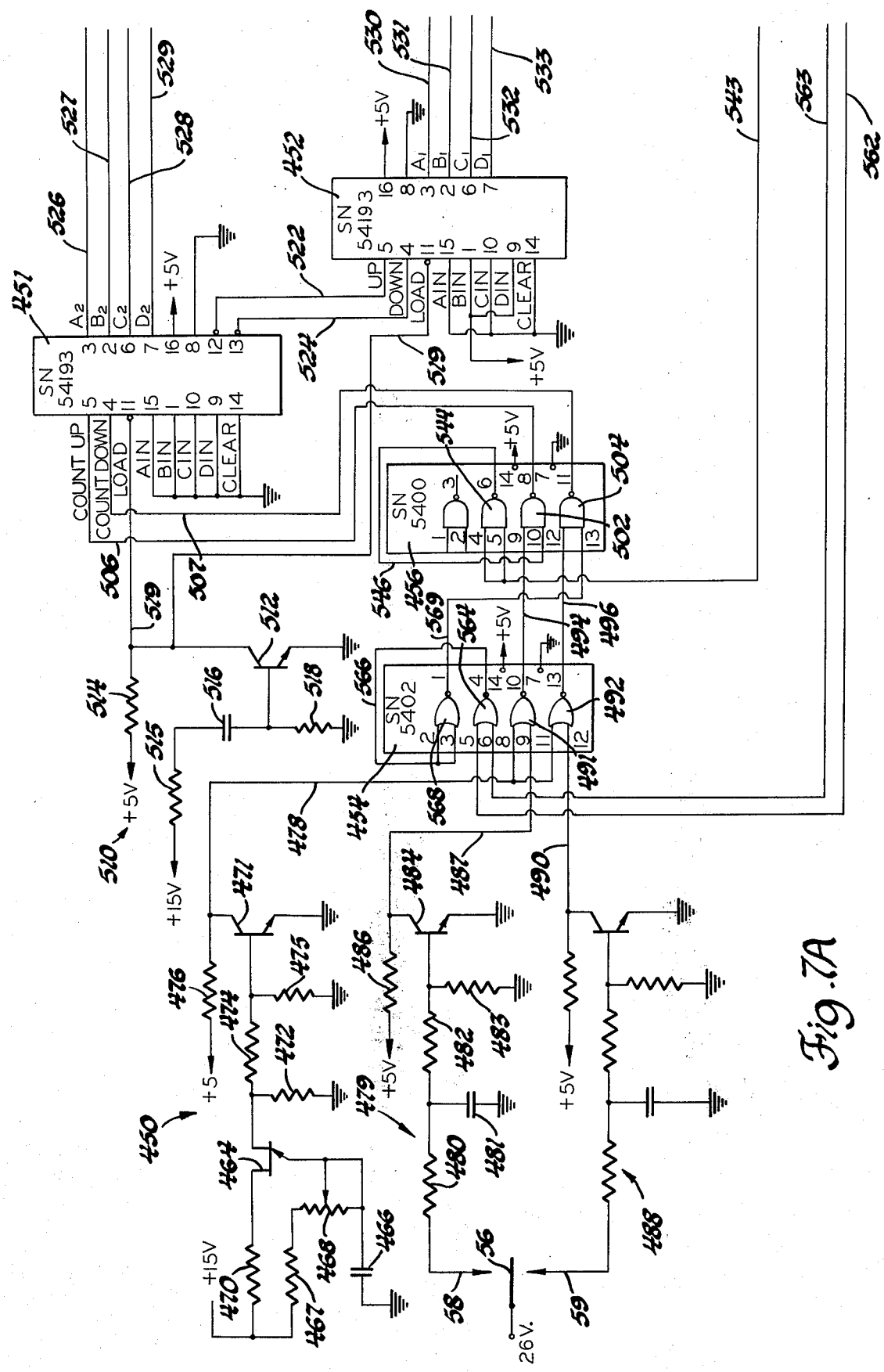
Figure 7B:
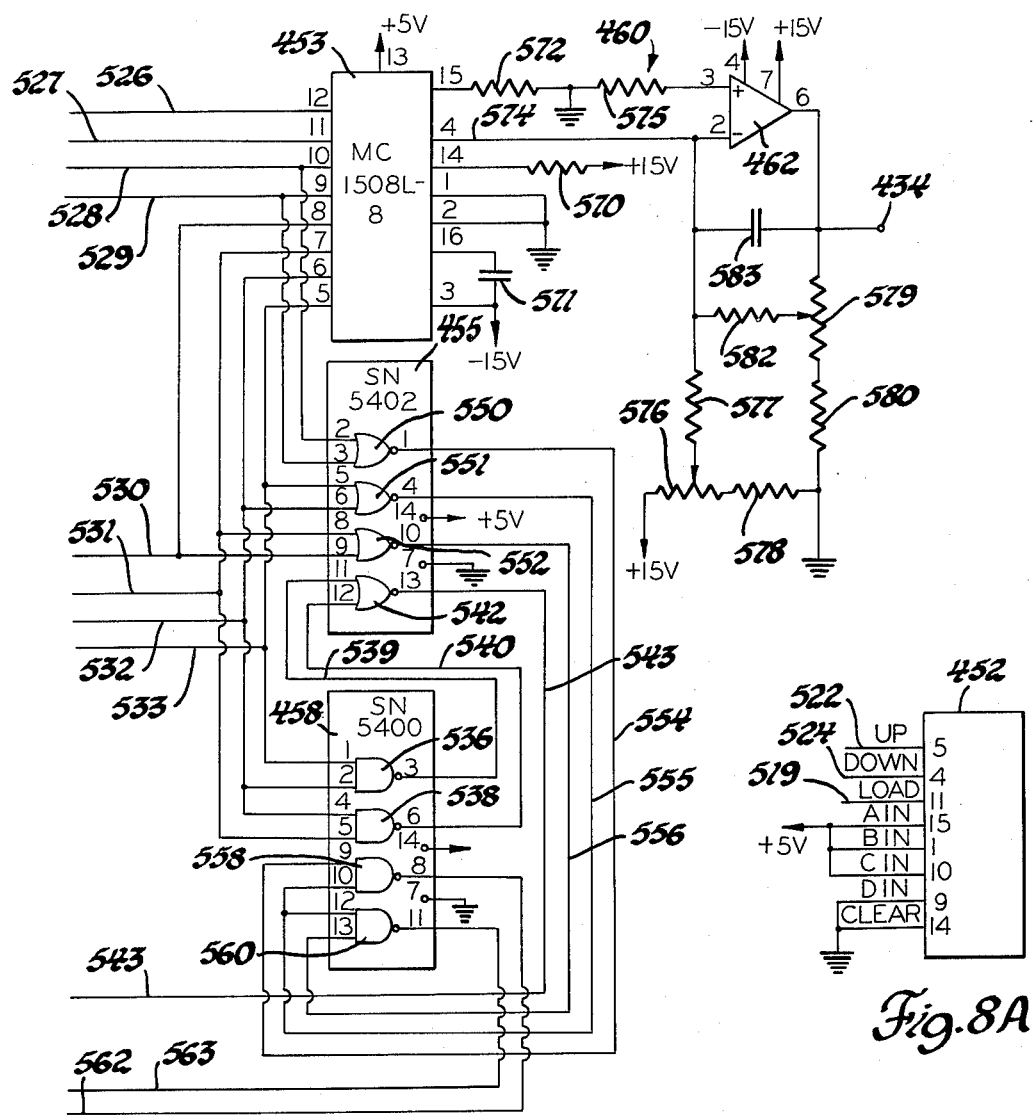

FIGS. 7A and 7B constitute a schematic diagram of the master beeper circuit.

Figure 8B:
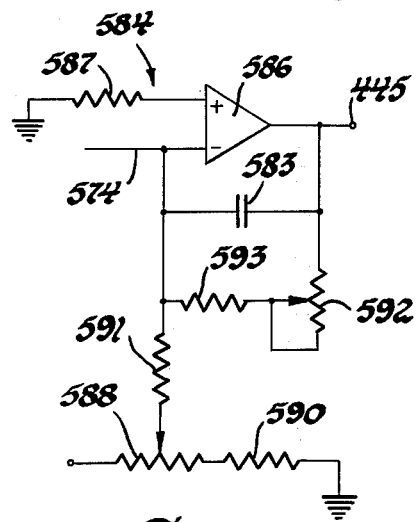
Figure 8C:
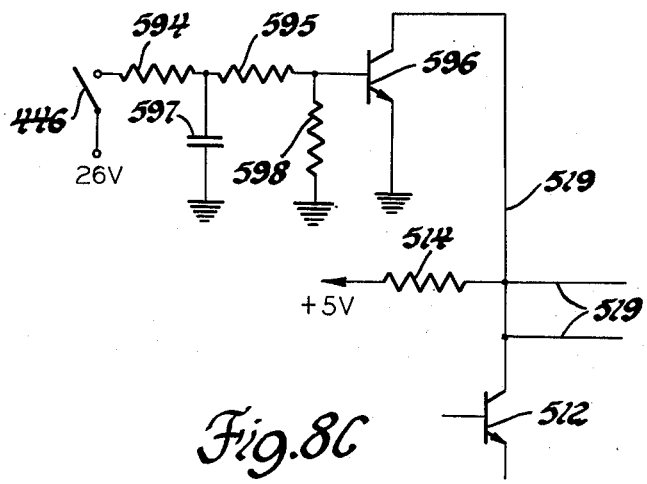

FIGS. 8A, 8B, and 8C are partial diagrams of the auxiliary beeper circuit.

Figure 1:
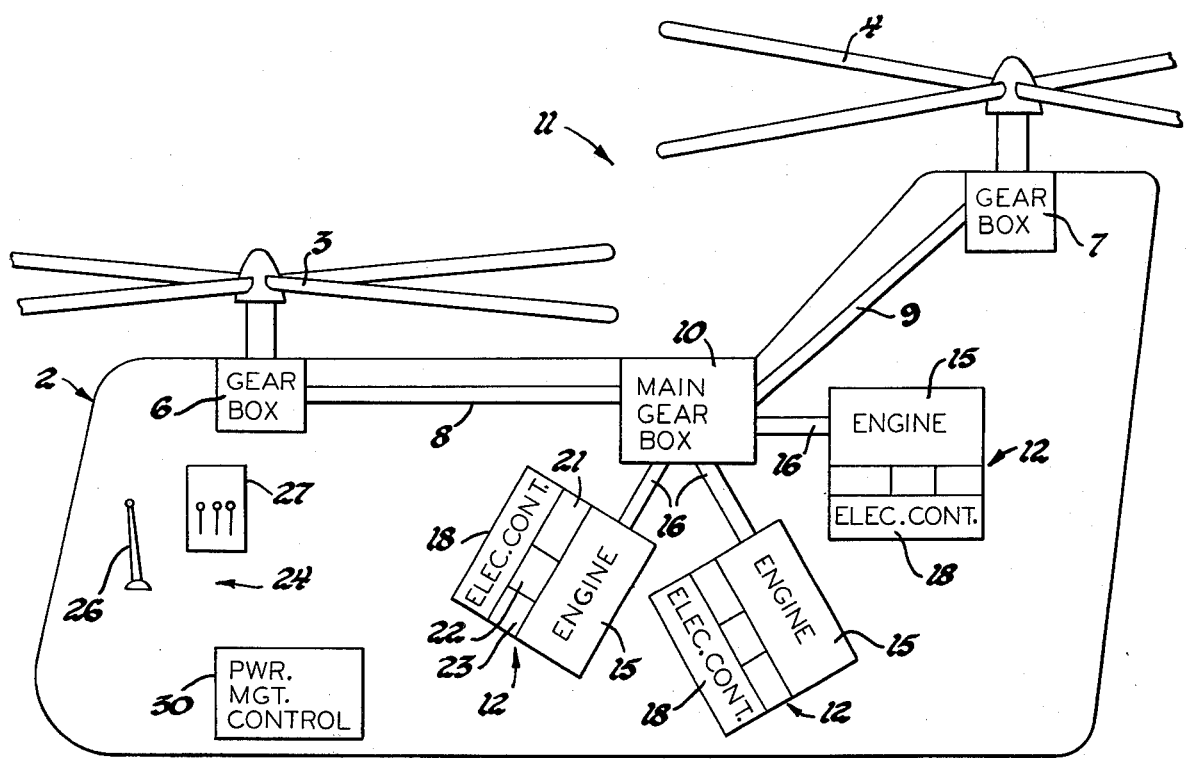
FIG. 1 is a much simplified illustration of a gas turbine powered helicopter.

Referring first to FIG. 1, this illustrates a helicopter installation to which the control system of the invention is applicable. This is a highly schematic diagram for orientation, and is not intended as a full description of the actual aircraft installation.

The particular installation for which this control is provided has been described more fully in a paper by J. Roger Alwang and Richard D. McLain entitled "Heavy-Lift Helicopter Engine Control System" presented at the 30th Annual National Forum of the American Helicopter Society in Washington, D.C., May 1974 (preprint No. 870). McCarthy U.S. Pat. No. 3,174,284, Mar. 22, 1965, may also be of interest as to helicopter engine controls.

FIG. 1 illustrates the aircraft so far as is necessary to an understanding of the control system of this invention. A helicopter 2 is of the type having a forward lifting rotor 3 and an aft lifting rotor 4. Rotor 3 is driven through a gearbox 6 and rotor 4 through a gearbox 7. These gearboxes are connected by shafts 8 and 9, respectively, to a main or combiner gearbox 10. The rotors, gearboxes, and shafts are termed the rotor system 11.

Power is supplied to the main gearbox by three power units 12, each of which includes a gas turbine engine 15 delivering power through a shaft 16 to the main gearbox. Each power unit includes also an engine electronic control 18 and various controls and accessories such as a fuel control 21, a compressor variable geometry actuator 22, and a starter 23. Each engine is of the gas-coupled or free turbine type. This means that it includes a gas generator comprising a compressor, combustion apparatus, and a turbine, and a power turbine energized by the discharge from the gas generator. The gas generator turbine and the power output turbine rotate independently, the latter driving the shaft 16. The shafts 16 are suitably geared together and to the rotor drive shafts 8 and 9 in the gearbox 10. An overrunning clutch (not illustrated) is provided between each shaft 16 and the common drive so that the rotor may not be braked by a casualty to an individual engine. Normally, however, the power turbines rotate synchronously as geared together through the main gearing in the box 10.

The aircraft includes a pilot's station at 24 with controls for the aircraft including a stick 26 by which the collective and cyclic pitch settings of the lifting rotor blades are controlled, as is well known. The pilot's station also includes an engine control quadrant or control panel 27 which bears a main control lever called a condition lever for each power unit, as well as other controls and switches to be described.

The other major element of the control system is a power management control 30 which has various functions in the coordination of the operation of the power units, to be described. The electronic controls, power management control, and control quadrant are connected together only by electric wiring (not illustrated in FIG. 1), as will be further described.

The details of the rotor system are immaterial to the present invention, which is equally applicable to a single rotor helicopter, or to other power plants having control requirements comparable to that illustrated.

GENERAL DESCRIPTION

Figure 3:
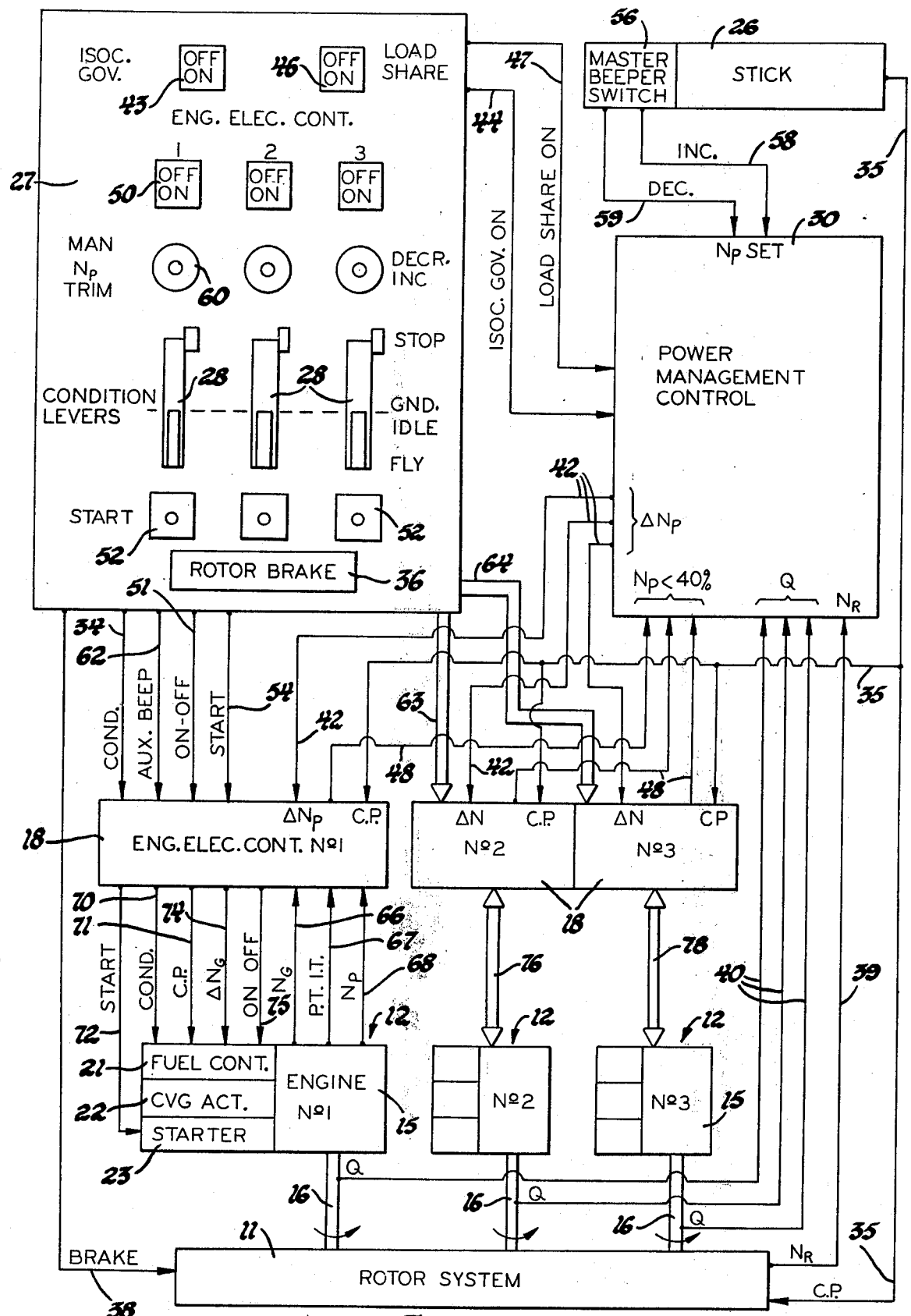
FIG. 3 is a general diagram of the overall power plant control system of the helicopter.

The nature of the interconnections between the major elements of the control system is set out in the system diagram of FIG. 3. It will be noted that the rotor system 11, power plants 12 including the component engines 15, engine electronic controls 18, fuel controls 21, compressor variable geometry actuators 22, and starters 23, are illustrated toward the bottom of the drawing. The control quadrant 27, pitch control stick 27, and power management control are illustrated in the upper part of the figure. As indicated, the control quadrant bears three condition levers 28 which are movable from a Stop position at one extreme to a Ground Idle or Start position at which the engine may be started and operated at minimum power, and further to a Fly or maximum power position at the other end of the range of movement. Engine power may be modulated between the Ground Idle and Fly positions, depending upon the movement of the lever in the quadrant.

The position of the condition lever is transmitted as an electrical signal to the engine electronic control through a line 34. An electrical signal representing collective pitch of the rotors is transmitted by a suitable transducer from the control stick 26, automatic flight control, or other source, through a line 35 to each engine electronic control; and to the rotor system 11 to set rotor collective pitch. Other transmission means to the rotor may be employed and other means of controlling rotor pitch may be employed, but the point with which the control system is concerned is that an electrical signal representing collective pitch is supplied to each engine electronic control.

The control quadrant 27 mounts a rotor brake control 36 which is connected as indicated by line 38 to the rotor drive system to hold the rotor against rotation until the brake is released. There is an interlock to prevent movement of any condition lever beyond Ground Idle until the brake is released. Line 39 represents means for transmission of a lifting rotor speed signal, specifically an alternating current the frequency of which is proportional to speed, to the power management control 30. The power management control uses the rotor speed signal as the input to isochronous governing means which establishes the final control of rotor and power turbine speed. A signal representing torque transmitted through the power output shaft of each engine is communicated to the power management control through transmission systems identified as 40. These signals are converted into potentials representing the torque output of each engine in the power management control. The rotor speed and engine torque signals are used to generate a power turbine governor trim signal, indicated as $\Delta N_P$, for each engine. These are transmitted through lines 42 to the respective electronic controls 18. The rotor isochronous governor is normally on but may be turned off by a switch 43 on the control quadrant connected through a line 44 to the power management control. Likewise, the load sharing features of the power management control are normally on, but may be turned off by a switch 46 on the quadrant connected through a line 47 to the power management control. Operation of each torquemeter circuit is inhibited below 40% normal rated power turbine speed by a signal transmitted through a line 48 from each of the engine electronic controls.

Each engine electronic control 18 is turned on by its respective switch 50 on the quadrant connected through a line 51 to the control. The control quadrant also mounts a Start switch 52 for each engine connected through a line 54 to the electronic control to turn on the starter. The starter is cut out by movement of the condition lever to Stop.

The system also includes means for varying rotor speed over a limited range from its normal value by operation of a master beeper switch 56 mounted on the control stick 26. The master beeper switch includes a switch member which is movable in either direction to cause an increase or decrease in rotor speed command. The switch is connected through the lines 58 and 59 marked "increase" and "decrease" to the power management control. The signal from the beeper switch is converted to a signal compatible with those generated to balance power output between the engines, and added to these signals to contribute to the $\Delta N_P$ governor trim signals transmitted through lines 42 to the several engine electronic controls.

There is also an auxiliary beeper or manual $N_P$ trim system by which any individual engine may be trimmed slightly in governor setting under certain conditions. The auxiliary beeper system includes a switch 60 on the control quadrant for each power unit which transmits a signal through lines 62 to the electronic control.

The broad arrows 63 and 64 on FIG. 3 represent transmission of signals to the No. 2 and No. 3 engine electronic controls corresponding to those transmitted to the No. 1 electronic control.

Each engine electronic control 18 receives signals from the stick 26 or other collective pitch control, the control quadrant 27, and the power management control 30 for control of the corresponding engine. It also transmits a signal of power turbine speed below 40% to the engine electronic control. It receives electrical signals of gas generator turbine speed, power turbine inlet temperature, and power turbine speed from the engine as indicated by arrows 66, 67, and 68. The engine electronic control transmits a current signal indicative of condition lever position over a line 70 and a current signal over line 71 indicative of collective pitch. The starter, geared to the gas generator, is energized from the electronic control through a line 72. The governor trim signal indicated by $\Delta N_G$ is transmitted through line 74 to the governor trim of the fuel control. This is a reversable current signal. On-off electrical signals for fuel shutoff valve control are transmitted through lines 75 to the fuel control.

The fuel control, which is mounted on the engine, receives inputs of gas generator rpm, engine inlet temperature, and compressor discharge pressure directly from the engine, and is driven by the engine. The compressor variable geometry actuator regulated by the fuel control acts to vary the setting of vanes in the engine compressor.

The broad arrows 76 and 78 represent transmissions between power units Nos. 2 and 3 and their electronic controls corresponding to those indicated specifically for power unit No. 1.

It may be reiterated that all of the communications between the elements indicated by the arrows in the diagram of FIG. 3 are by electric potentials or currents and, therefore, may be transmitted by suitable wiring.

Figures 4, 5, 6:
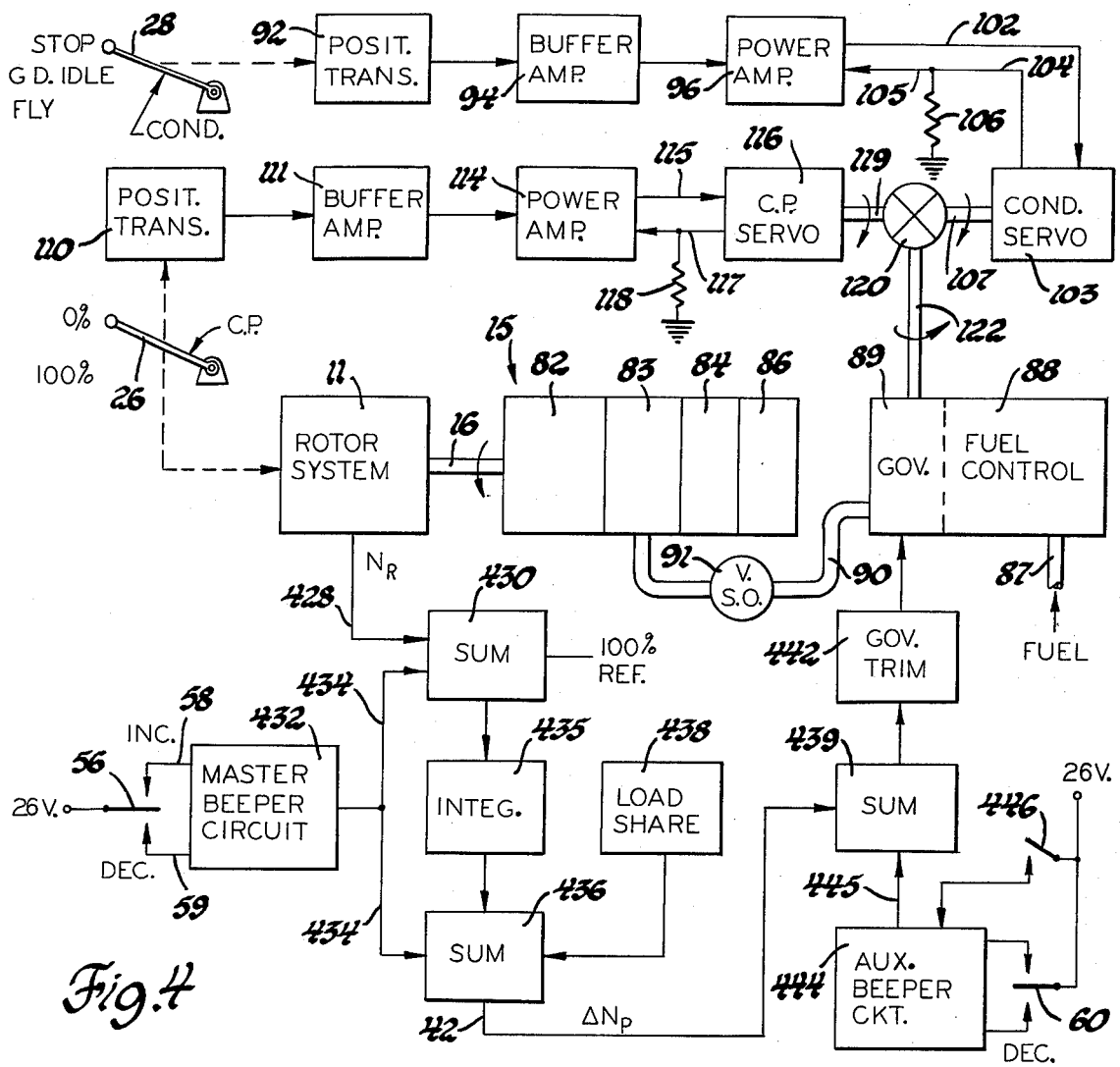
FIG. 4 is a schematic diagram of portions of the control system particularly showing the relation of the beeper circuits to other elements of the power plant.
FIG. 5 is a partial truth table for the master beeper circuit.
FIG. 6 is a partial truth table for the auxiliary beeper circuit.

Getting now into the relation of the hydromechanical fuel controls to the engines, we refer first to FIG. 4 which illustrates any one of the gas turbines 15 as comprising in flow series a compressor 82, a combustion apparatus 83, a high pressure turbine 84, and a low pressure turbine 86. The high pressure turbine drives the compressor and the low pressure turbine 86, otherwise called the power turbine, drives the power output shaft 16 which extends through the gas generator comprising elements 82, 83, and 84. As with gas turbine engines in general, the basic control of the engine is by control of the supply of fuel. Fuel is delivered by an engine driven pump (not illustrated) through conduit 87 to the engine fuel control 88. The fuel control includes, among other instrumentalities, a governor 89 driven by the gas generator turbine 84 of the engine. The fuel control contains suitable provisions for determining the amount of fuel allowed to flow to the engine for steady state operation, acceleration, and deceleration, and for returning the excess to the pump inlet by conventional means (not illustrated). The fuel control 88 discharges fuel through a metered fuel line 90 in which is interposed a fuel shutoff valve 91. Valve 91 is opened when it is desired to initiate combustion during starting of the engine and remains open as long as the engine is operating.

We do not attempt here to describe the fuel control in detail, since such details are immaterial to the present invention. A great number of fuel control devices which may be used for the purposes of the present invention are known. The particular control 88 employed in practice of the present invention is manufactured by the Woodward Governor Company of Rockford, Ill. Some insight into the structure of such engine governors may be had, if desired, from consideration of the following U.S. Pat. Nos.: Plummer 3,426,777, Feb. 11, 1969; Barnes, 3,422,277, May 6, 1969; and Witt, 3,722,884, Nov. 20, 1973. As with most fuel controls for a gas-coupled gas turbine engine, this device includes a governor rotated by the gas generator turbine which controls a fuel metering valve. The basic speed setting of this governor is determined by an input which loads the speeder spring of the governor. It is also responsive to a second loading which we may call a governor trim or $\Delta N_G$ signal.

The setting of the speeder spring of the governor 89 is effected through servo systems responsive to the settings of the condition lever 28 of the particular engine and the collective pitch lever or stick 26 which is connected to all of the fuel controls. As illustrated in FIG. 4, the condition lever 28 is connected to a position transducer 92 which transmits an electrical potential signal representing position of the condition lever to a buffer amplifier 94 which transmits a potential signal through line 95 to a power amplifier 96. The position transducer is a commercially available type device which generates a signal that is a predetermined function of the position of the condition lever. One example of such a device is a potentiometer, but more sophisticated devices such as linear-variable differential transformers are preferred. This may be coupled to the condition lever through a non-linear motion transmission linkage.

The power amplifier responds to the potential signal to generate a current which varies with condition lever position. The current is fed through a power lead 102 to a condition lever servo 103 and the current returns to ground through a line 104 and a low resistor 106. The condition lever servo is a torque motor type device which rotates an output shaft 107 proportionally to the current supplied to the motor. A potential proportional to the value of servo current is fed back to the power amplifier through a branch 105 of line 104.

The collective pitch stick 26 is connected through a position transducer 110 and buffer amplifier 111 to a power amplifier 114. The potential signal fed to power amplifier 114 causes transmission of a corresponding current signal through line 115 to a collective pitch servo 116. Current is returned to ground through line 117 and low resistor 118. The potential drop across the resistor provides a feedback of current value to the power amplifier through a branch of line 117. The collective pitch servo also is a torque motor type device which rotates its output shaft 119 as a direct function of collective pitch of the helicopter rotor. Rotations of the shafts 107 and 119 are added in a mechanical differential gear 120 which rotates a shaft 122 entering the fuel control 88 and coupled through suitable mechanism to the speeder spring of the gas generator turbine governor. It will thus be seen that the setting of this governor is a function of the position of the condition lever and of rotor collective pitch.

Figure 2:
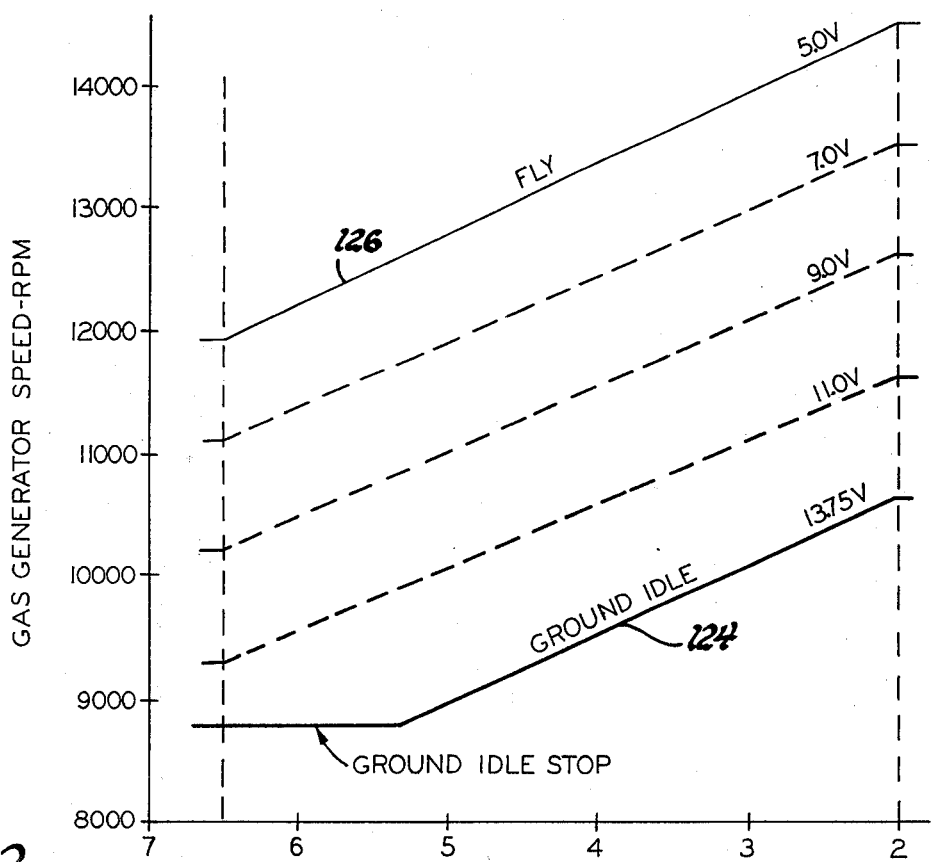
FIG. 2 is a chart illustrating the effect on gas generator governor speed setting of condition lever and collective pitch inputs.

The effects of the collective pitch and condition inputs to the fuel control are shown in FIG. 2. This is a plot of gas generator speed as a function of collective pitch input and the condition lever input. The condition lever input is represented by a family of lines, the lowest line 124 of which is identified as "Ground Idle" and the uppermost 126 as "Fly". The collective pitch input from transducer 110 and buffer amplifier 111 varies over a range from 6½ volts for minimum pitch down to 2 volts for maximum pitch. The input from the condition lever transducer 92 and buffer amplifier 94 varies from 13.75 volts with the condition lever at ground idle position down to 5 volts with the condition lever at the maximum or Fly position. Thus, gas generator governor setting is increased as the condition lever is moved from Ground Idle toward the Fly position and as the collective pitch lever is moved from flat pitch toward maximum pitch. The input from the collective pitch lever anticipates and approximately compensates for the load added to or subtracted from the engine by changes in rotor pitch. The condition lever input normally is set to Fly; that is, to call for maximum condition lever speed input, and the speed is then trimmed by other instrumentalities. However, the condition lever may be used as a means to control the power output of the engine between Ground Idle and Fly by movement of the condition lever. The minimum gas generator speed setting is approximately 8800 rpm in this particular case as determined by a fuel metering valve minimum flow stop. Of course, the values of speed and voltage set out are merely those selected for this particular engine and aircraft installation, and might be different for other cases. It is considered highly desirable, however, to have the control potential decreased for increasing rotor pitch and for increasing power setting of the condition lever, since this results in a fail-safe condition where interruption of power in the electrical system tends to produce maximum power from any engine, and maximum rotor pitch. If not corrected in other elements of the system, as later described, the pilot may correct any error.

GOVERNOR TRIM SYSTEM

As indicated above, this disclosure is particularly directed to the speed trim or beeper circuits. There is a master beeper circuit by which the speed setting of the lifting rotor governor may be varied over a certain range from the nominal rated speed. There is also an auxiliary beeper circuit for each engine which makes it possible to vary the setting of the gas generator governor of that engine either positively or negatively to a limited extent.

These beeper circuits are portions of the power management and engine control systems outlined above. It seems best to preface a description of the circuits by some further description of the system, omitting details which seem irrelevant to the present invention.

It may be pointed out that the power management and engine control systems form the subject matter of my copending applications, of common ownership and filing date with this application, Ser. No. 489,263 now U.S. Pat. No. 3,930,366, and Ser. No. 489,264. It is believed, however, that FIG. 4 provides sufficient basis for understanding the relation of the beeper circuits to control of the helicopter power plant.

Referring to FIG. 4, a potential signal representing lifting rotor speed and therefore power turbine speed is supplied from a tachometer circuit responsive to rotor speed through a line 428 to a summing circuit 430. This summing circuit receives a 100% rated or datum rotor speed reference signal and also receives a rotor speed trim signal from the master beeper circuit 432 through a rotor speed trim signal line 434. The rotor speed trim signal progressively increases or decreases as switch 56 is operated to energize line 58 or line 59. The sum of the 100% reference and the speed trim signal is the desired or command value of rotor speed. The signal on line 428 is the actual value. The difference is the speed error signal. The summing circuit determines the rotor speed error signal and supplies it to an integrating circuit 435 which integrates speed error with respect to time. The output of the integrator is fed to a summing circuit 436. This also receives the output of the master beeper circuit in line 434 to provide immediate response to rotor speed change command without error integrating circuit delay. The summing circuit 436 also may receive a potential signal for resetting the engine governor to equalize torques of the several engines from a load sharing circuit 438. This circuit receives inputs of actual torque outputs of all engines, determines the highest torque, and determines the torque deficiency of each engine (zero for the highest torque engine). This signal is added to the beeper circuit signal and the integrated rotor speed error circuit to provide a $\Delta N_P$ or power turbine governor trim signal in line 42 to a summing circuit 439. This summing circuit is provided to add the auxiliary beeper signal. Assuming for the present that the auxiliary beeper signal is zero, the summing circuit 439 transmits a governor trim or $\Delta N_G$ signal to the governor trimming means 442. The governor trimming means includes servomechanisms which apply a fluid pressure to the governor which adds to or subtracts from the force of the governor speeder spring so that it effectively changes the setting of the engine governor and thus gas generator speed of the engine. The trim means can adjust governor setting by about 15% of nominal maximum gas generator speed in either direction.

As indicated schematically, the governor trimming means provides an input to the governor 89 in fuel control 88 which correspondingly changes fuel flow to the engine to bring gas generator speed to a value based upon the input through shaft 122 plus or minus the bias imparted by the governor trimming means. This trimming of gas generator speed correspondingly affects the torque of the power turbine and thus the division of load between the engines. It also reflects any necessary change in overall power output by trimming all governors concurrently to maintain the desired rotor speed.

It should be understood that the master beeper circuit, summing device 430, and integrator 435 are elements of the entire power plant. The torque correction circuit provides an individual signal to each engine. The summing circuit 436 and elements downstream are individual to a particular engine.

If the load sharing system represented by element 438 is cut out, the governor of any engine may have its speed varied to a limited extent by an auxiliary beeper circuit 444 for that particular engine. As illustrated, the auxiliary beeper circuit responds to increase or decrease signals from the auxiliary beeper switch 60 for that engine on the control quadrant 27. When the switch 60 is moved to Increase, the potential delivered by the beeper circuit progressively decreases and, when it is set to Decrease, the potential progressively increases. The auxiliary beeper circuit is reset to zero output and held there by a 26 volt input through a switch 446 which is closed when the load sharing system is effective. The torque correcting system and the auxiliary beeper system would conflict if simultaneously effective. The auxiliary beeper input added in summing circuit 439 to the $\Delta N_P$ input provides the gas generator trim or $\Delta N_G$ signal sent to the governor trimming means 442.

It will be clear from the foregoing, therefore, that the master beeper circuit provides a potential signal which is added to other controlling signals in the system to change total power output as required to obtain the desired rotor speed. The auxiliary beeper circuit is operable to reset to a limited extent the governor of the corresponding engine by generating a potential indicative of desired change which is routed through the engine control system to the governor trimming means.

The master beeper circuit and the auxiliary beeper circuit are similar, as will be seen from the succeeding detailed description of preferred embodiments of the circuits.

MASTER BEEPER CIRCUIT

The master beeper circuit is illustrated fully in the schematic diagram of FIG. 7 (FIGS. 7A and 7B). It includes inputs for the increase and decrease signals from the 26 volt circuit through the normally open switch 56 which may be moved to energize the increase speed input line 58 or the decrease speed line 59. It includes an oscillator 450 which generates driving pulses for the counting circuits. It includes two 4-bit up/down counters 451 and 452 which are cascaded to provide an 8 bit or 8 digit binary counting mechanism. The counters 451 and 452 are commercially available assemblies manufactured by Texas Instruments Incorporated of Dallas, Tex. under Model No. SN54193.

The circuit includes a digital to analog converter 453 which functions to translate the binary count on the counters 451 and 452 into an electrical signal which is a linear function of the count. This device is known as an 8-Bit Multiplying Digital-to-Analog Converter, Model MC1508L-8, manufactured by Motorola Semiconduuctor Products, Incorporated, Phoenix, Ariz.

The circuit comprises logic elements including quadruple two-input positive NOR gate assemblies 454 and 455, type SN5402 and quadruple two-input positive NAND gate assemblies 456 and 458, type SN5400, both manufactured by Texas Instruments. The logic devices 454, 455, 456, and 458 operate to route signals to the counter to stop the count at the limits of the desired range.

Finally, the circuit includes an output circuit 460, including an operational amplifier 462, which delivers the rotor speed trim signal to line 434.

Reference above to commercial counting, logic, and converter circuit assemblies is merely indicative of preferred equipment, and it will be understood that equivalent devices may be substituted. Also, in the succeeding detailed description of the circuit, references are made to values of parameters such as voltages, resistances, capacitances, and identification of circuit components. These are preferred in the present state of the art for the particular installation, but are subject to modification as desired to vary the operation of the beeper circuit for any particular installation or to take advantage of advances in the electronic arts.

The beeper circuits are connected to controlled current supplies providing inputs of +15 volts, +5 volts, minus 5 volts, and ground. These are not illustrated, and may follow usual practice in the art. The connections to these sources are indicated on the schematic diagram.

Considering first the pulse generating oscillator 450, this embodies a unijunction transistor 464 (type 2N4949) which controls charge and discharge of a one mf. capacitor 466. The charging circuit is from +15 volts through a 15 kilohm resistor 467, a 10 kilohm potentiometer 468 connected as a variable resistor, and capacitor 466 to ground. The +15 volt supply is also connected through an 820 ohm resistor 470 to base No. 2 of the transistor. The emitter of the transistor is connected to ground through capacitor 466. Base No. 1 of the transistor is connected to ground through a 10 ohm resistor 472 which discharges the condenser when transistor conducts. The resulting voltage pulses across resistor 472 are coupled to the base of an NPN transistor 471 through a voltage divider comprising 2K resistor 474 and 1K resistor 475. The letter K is an abbreviation for kilohm.

The unijunction transmitter operates in known fashion to discharge capacitor 466 intermittently and the capacitor causes transistor 464 to conduct intermittently. Each time transistor 464 conducts, it drives the base of transistor 471 positive. Transistor 471 has a grounded emitter and a collector connected through a 10K resistor 476 to the 5 volt supply. This transistor and all the remaining transistors in the circuit are type 2N2222A. When the transistor is turned off, there is a 5 volt potential on the pulse generator output line 478, and when it conducts, the output drops to near zero. The result is a series of pulsations in line 478. Five volts represents logical one in the circuits to be described and near zero volts represent logical zero. The frequency of the pulse is determined by the RC constants, and is selected to give the desired rate of counting and therefore time to traverse the counting range.

The increase signal on line 58 is delivered to the counting circuit through an input coupling amplifier 479 comprising a 4.7K resistor 480 and a 1 mf. capacitor 481 connected in series to ground. The junction between these is connected to ground through a voltage divider comprising a 4.7K resistor 482 and 1K resistor 483. The junction of resistors 482 and 483 is connected to the base of an NPN transistor 484, the emitter of which is grounded and the collector of which is connected to the 5 volt supply through a 10K resistor 486. When the increase line 58 is energized by the beeper switch 56, the base of transistor 484 is energized to cause the transistor to conduct, pulling the voltage on increase logic input line 487 down from 5 volts, representing logical one, to approximately zero volts, representing logical zero.

The decrease line 59 is connected to a decreased logic input line 490 by a circuit 488 identical to circuit 479. Thus, when the line 59 is energized, line 490 carries a logical zero and, when it is not energized, it carries a logical 1.

The circuits 479 and 488 thus provide the means for properly inserting the increase and decrease commands from the beeper switch 56 into the beeper counting and logic circuits. Line 487 enters one input of a NOR gate 491 and line 490 one input of a NOR gate 492, both in the multiple NOR gate device 454. The other input of each of these NOR gates is energized from the pulse generator through line 478. The characteristic of these gates is that when and only when there is a logical zero at both inputs, there is a logical 1 output. There is a zero on the input of either gate from line 487 or 490 only if the corresponding input line 58 or 59 is energized. There is a 1 on the line 478 during about half of each pulse cycle and a zero during the remaining part of the cycle. Thus, the gate 491 or 492 which is receiving the zero "increase" or "decrease" signal provides a logical one on its output line during the zero portion of the pulser cycle.

The output lines 494 and 496 from the respective NOR gates are connected to one input of a NAND gate 502 or 504, respectively. The NAND gates have the characteristic that if and only if there is a logical 1 at both inputs, there is a logical zero output. A logical zero at either or both inputs will produce a logical one output. The result is that gate 502 output is zero when line 494 is 1 and 1 when 494 is zero, unless the other input to the gate is zero, in which case the output is constantly 1 and no sequence of pulses is delivered. Gate 504 responds similarly to its input. The outputs of these gates are fed through a count up line 506 to a count up terminal and a count down line 507 to a count down terminal of counter 451. We may assume that the so far undescribed inputs to gates 502 and 504 are logical 1 for the time being.

The characteristics of the counter 451 are that it counts by a low to high level transition of either count input while the other count input is high. Thus, when counting up line 507 is held energized, and when counting down line 506 is held energized, while the other line pulses in each case.

The internal structure or circuitry of the counters 451 and 452 need not be described. These are commercially available catalog items. however, to understand the system, a brief account of the external connections and operating characteristics of the counters may be helpful. In this description, the external connection terminals of the counter are referred to by the numerals shown on the block representing the counter, with the numerals in parenthesis to avoid confusion. Energization of the counter is from plus 5 volt supply connected to (16) and ground connected to (8). There is a count up input (5) and a count down input (4). Count up or count down is accomplished by transition of the appropriate input from low to high while the other remains high. Terminals (3), (2), (6), and (7) respectively provide outputs of the first, second, third, and fourth binary digits.

The counter may be loaded to any numerical value by supplying logic 1 or zero as required to the first through fourth digit inputs (15), (1), (10), and (9) respectively, which a load input (11) is held low (logical zero). A clear input (14) forces all digits to zero when a high level is applied to it. The other connections are a carry output (12) which transmits an impulse when the counter reaches full count and receives another count up pulse; that is, goes from binary 1111 to binary 0000 and a borrow terminal (13) which delivers a pulse when the counter underflows. These terminals are connected to the count up and count down terminals of a second such 4-bit counter to provide 8-bit counting. In this arrangement, counter 451 handles the first four binary digits and counter 452 handles the fifth through eighth binary digits in cascade with the counter 451.

It will be noted that all input terminals of counter 451 are grounded with the result that this counter will load to 0000 when the load terminal (11) is at low. The clear terminal (14) is grounded; clearing of the counter is not employed. The more significant bit counter 452 has the second and fourth bit inputs connected constantly to plus 5 volts and the first and third digits, as well as clear, grounded. This counter will load to 1010.

The load signal to the load terminals of the two counters is provided by a loading circuit 510. This includes a circuit from ground through the emitter-collector circuit of an NPN transistor 512 and a 10K resistor 514 to plus 5 volts. The transistor is turned on when the master beeper power supply is energized by a base connection to +15 volts through a 0.1 mf. capacitor 516 and a 47K resistor 515, and to ground through a 10K resistor 518. The collector of transistor 512 is connected through lines 519 to the load terminal of each counter and its emitter is grounded. When power is turned on, the transistor conducts, and a load signal due to drop through resistor 513 is transmitted through line 519 to the two counters to set the digits at the values determined by the input connections. Upon charging capacitor 516, transistor 512 is turned off to produce a 5 volt input to the two load terminals and disable the load circuit. The initial impulse thus sets the counters to the turn-on set or datum count 10100000 (160 decimal), as indicated in FIG. 5.

We have explained counting up or down by operation of switch 56 to energize either of lines 58 and 59. Starting from the turn-on set point determined at the initial energization of the circuit, the counter may count up to increase rotor speed or down to decrease speed. Digits are carried from counter 451 as required through line 522 to the count up input of counter 452. Likewise, the count is borrowed from counter 452 through line 524 as count down requires it. The cascaded counters thus serve as a 8-bit binary counter.

The binary digits are read out into the digital to analog converter 453 through lines 526 through 533 transmitting, respectively, from the least significant to the most significant bit. As previously indicated, this converter produces an electrical output which is an analog representation of the digital input.

We now continue with the logic circuits which determine the maximum and minimum count limits. With reference to the truth table in FIG. 5, it will be seen that the minimum or count-down limit is 00000011 binary (3 decimal) which corresponds to an output of minus 10 volts from the beeper circuit. Here all digits but the lowest two are zero. On count-up, the maximum limit is 11100000 (224 decimal) for plus 4 volts output. In this case, the three most significant bits become ones.

The count up is terminated by a logic circuit as follows: Line 532 is connected to one input of each of NAND gates 536 and 538. Lines 533 and 531 are connected respectively to the other inputs of these gates. Thus, when the three most significant bits become one during the count up, both these gates have two logical one inputs and both, therefore, deliver a zero output. These zero outputs are fed through lines 539 and 540 to a NOR gate 542. This gate provides a one output when and only when both inputs are zero; therefore, there is a one signal on its output line 543 when and only when the three most significant bits of the counts are all one. Line 543 is connected to both inputs of a NAND gate 544 which serves as an inverter, converting the logical one signal to a logical zero. This logical zero signal is carried through line 546 to one input of NAND gate 502 which, as previously described, receives a series of pulses through line 494 when the switch 56 is closed on the increase line 58. When the input on line 546 to the gate 502 is zero, the pulses cannot be transmitted, since the output of the gate is always a logical one. Thus, count up is terminated and line 506 is energized constantly for count down. If the count is below 11100000, the circuit just described including gates 536, 538, 542, and 544 provides a logical one signal to gate 502, allowing it to transmit the pulses to the counter.

The minimum count limit is reached when the first six significant bits all become zero. Lines 528 through 533 which carry these digits are connected in pairs to three NOR gates 550, 551, and 552. These gates deliver the one output signal only when both inputs are zero. Thus, when the six most significant digits become zero, the three output lines 554, 555, and 556 from the respective NOR gates transmit logical one signals to NAND gates 558 and 560 as shown.

Therefore, when and only when the first six significant bits become zero both inputs to each gate 558 and 560 are one and the outputs of both gates are zero. These two outputs are connected through lines 562 and 563 to both inputs of a NOR gate 564. When both these inputs are zero, the output is a one signal which is transmitted through a line 566 to both inputs of a further NOR gate 568 which acts as an inverter. The resulting zero output signal from gate 568 through line 570 provides the disabling signal to gate 504. This acts similarly to the disabling of gate 502 at the upper limit. The minimum limit of the counter is binary 00000011 equal to 3 decimal. It will be seen that from the turn on point to the minimum limit is 157 count and from the turn on point to the maximum limit is 64 count. If the digital to analog converting circuits provide an output of approximately 1/16 volt per count, it will cover the range from minus 10 to plus 4 volts in the output, as indicated in FIG. 5.

Proceeding now to the digital to analog conversion, the converter 453 receives digits from the least significant to the most significant on its terminals (12) through (5), respectively, through lines 526 through 533, respectively. It is energized from the +15 volts through a 7.5K resistor 570. Terminals (1) and (2) are grounded; terminal (3) is connected to the minus 15 volt line, and terminal (16) is connected to minus 15 volt through a 100 picofarad capacitor 571. Terminal 15 is grounded through a 7.5 K resistor 572. We are not concerned here with the internal structure or mode of operation of the converter, since it is a commercially available device. When connected as illustrated, the output of the converter is a current flowing into its terminal (4) which increases linearly from substantially zero milliamperes at numerical zero input to about 2 milliamperes at numerical 255 input, the largest number available in an 8-bit binary system.

The output desired for speed control purposes in this case, as indicated in FIG. 5, varies from minus 10 volts at the minimum limit to +4 volts at the maximum limit. This output delivered to line 434 is derived from the converter output current in line 574 by the output circuits 460. Line 574 is connected to the inverting input of operational amplifier 462 and the non-inverting input is grounded through a 3.9 kilohm resistor 575. The current flowing into line 574 comes from the +15 volt supply which is connected through a 1K potentiometer 576 and an 8.25K resistor 578 to ground. The movable contact of the potentiometer is connected through an 11K resistor 577 to line 574. The potential due to the flow into the converter thus varies the potential drop through 576 and 577. This is balanced against the potential on the amplifier output line 434, this line being grounded through a 1K potentiometer 579 and a 12.4K resistor 580. The movable contact of potentiometer 579 is connected to line 574 through a 7.15K resistor 582. The amplifier output is also connected to the inverting input through a 0.1 mf. capacitor 583. The result of the operation of the output circuit 460 is to provide a potential which varies linearly from minus 10 volts to +4 volts as the count varies from decimal 3 to decimal 224 and is zero at decimal 160, the set point. Calibration of the output is accomplished by adjusting potentiometers 576 and 579.

It will be clear from the foregoing that this rather simple counting, logic, and conversion circuit provides very suitable means to adjust the rotor speed command. Because of the use of commercial assemblies the connection of the system is relatively simple.

AUXILIARY BEEPER CIRCUIT

The auxiliary beeper circuit is similar in most respects to the master beeper circuit. For this reason, it is illustrated in FIG. 8 (FIGS. 8A, 8B, and 8C) only to the extent of illustrating those parts of the circuit which have connections different from or additional to those of the master beeper circuit. In describing this circuit, the same numerals will be applied as to the master beeper circuit, so far as they are applicable.

Referring to the truth table in FIG. 6, it will be seen that the two limits of the count are the same for the auxiliary beeper as for the master beeper. The set point is different and in this case is substantially halfway between the two limits so that the range is about equal in either direction from zero. The output of the beeper ranges from minus 5 volts for the minimum limit to +5 volts for the maximum limit. This voltage range is a function of the output circuits from the digital to analog converter, which can be designed to provide any desired scale within reason.

Since the maximum and minimum limits are the same, the logic circuits remain the same as previously described. Since the set point is different, the connection of the load circuit is different, as illustrated in FIG. 8A. The set point in this case calls for the fifth, sixth, and seventh bits to be logical one with the others zero. Thus, the counter 451 is connected in the same way for loading. However, counter 452 is connected with the most significant bit terminal grounded and the A, B, and C input terminals connected to the +5 volts. When the load input 11 is brought to logical zero, the +5 volt sets the fifth, sixth, and seventh digits to the one value, while the ground on the eighth digit and on the first four digits sets them to zero.

Considering now the output amplifier circuit indicated as 584 in FIG. 8B, this is provided to give the desired range of output on the auxiliary beeper output line 445 and thus is different in the values of constants although not in principle from that just described for the master beeper circuit. The plus input of the operational amplifier 586 is grounded through a 4.02K resistor 587. The output is connected to the inverting input through a 0.01 mf. capacitor 583. Current is supplied to the converter input line 574 from +15 volts through a 2K potentiometer 588 which is connected to ground through a 5.49K resistor 590. The movable contact of the potentiometer is connected to line 574 through a 14.3K resistor 591. The output line 445 is connected to line 474 through a variable resistor defined by a 2K potentiometer 592 and a 4.75K resistor 593.

The values of some elements of the circuit not illustrated in FIG. 8 are changed from those of the circuit shown in FIG. 7. Resistor 467 is 8.25K and resistor 470 is 825 ohms in the pulse generating circuit. Resistors 480 and 482 and the corresponding resistors in the decrease circuit are 4.9K. Resistor 515 of the loading circuit is changed from 47K to 4.75K.

There is one element of the auxiliary beeper circuit which is not present in the master beeper circuit. This is the input which resets the auxiliary beeper to the zero output and holds it there when load sharing is on. This is the switch 446 illustrated in FIG. 4 and FIG. 8C. When load sharing is on, it connects 26 volts through 4.99K resistors 594 and 595 to the base of an NPN transistor 596. There is a circuit from ground through the emitter-collector circuit of this transistor to the load line 519, which is also energized through the previously described circuit including resistor 514 and transistor 512. The junction between resistors 594 and 595 is grounded through a 1 mf. capacitor 597 and the base of transistor 596 is grounded through a 1K resistor 598. When switch 446 is closed, the base of transistor 596 is driven to cause it to draw current from the 5 volt line through resistor 514 and pull the potential on load line 519 down to substantially zero. This resets the counter to the 01110000 count for the zero volt output and holds it on this count as long as load sharing is on.

CONCLUSION

It should be apparent that the control system and beeper circuits described herein are particularly well adapted to achieve the desired results of control of a helicopter or other power plant. The system is very flexible as to speed of output, possible output range, and location of the set point, either in the middle of the range or off toward one or the other end of the range.

As will be apparent from the examples described, the turn-on set point and the limits of the counter may be readily varied by changes in the connections to the counter and by variations in the connections of the limit logic to select critical digits to turn off the count up or count down inputs to the counter.

In the preferred embodiment described above, the master beeper is pulsed at about 31 Hz and covers the range of 14 volts from minus 10 to plus 4 in seven seconds. The auxiliary beeper is pulsed at 56 Hz and operates over a range from minus 5 to plus 5 volts, thus requiring approximately four seconds to traverse the entire range.

With the 8 digit counter, the number of steps makes possible extremely small voltage steps in the output. In each case described there are 220 digital steps from minimum to maximum output levels. The reliability and ease of fabrication of the control is facilitated by the use of commercially available gate, counter, and digital to analog converter assemblies.

The detailed description of the preferred embodiment of the invention for the purpose of explaining the principles thereof is not to be considered as limiting or restricting the invention, since many modifications may be made by the exercise of skill in the art.

I claim:

1. A control system for a power plant including a plural number of combustion engines connected to drive a common load comprising, in combination, a fuel control for each engine operative to control fuel flow to the respective engine, first means settable by an operator effective to vary the power setting of said fuel controls, power trim means coupled to each fuel control effective to modify the power setting of the fuel control, digital up/down counter means having an input and an output, digital-to-analog conversion means having an input to receive the output of said digital counter means and means to convert the output of said digital counter means into an analog electrical signal for transmission to the power trim means, means effective to load the counter means to a predetermined set count when the fuel control is initially energized, beeper means effective to vary the power trim means of the engine over a preset range from a nominal rated speed, said beeper means including second means settable by an operator including a normally open switch having a speed increase and a speed decrease position, means including first logic means having gates operable in response to positioning of said switch in speed increase or decrease positions to send increase and decrease electrical pulse signals to the input of the preset counter means, and second logic means receiving signals from the output of said counter means prior to passage thereof to the input of said conversion means, said logic means having gates responsive to critical digits in the counter and effective to condition said first logic means to block transmission of signals from said first logic means to the input of said counter means at preset minimum and maximum count levels at the output of said counter means.

2. A control system for a power plant including a plural number of combustion engines connected to drive a common load comprising, in combination, a fuel control for each engine operative to control fuel flow to the respective engine, first means settable by an operator effective to vary the power setting of said fuel controls, power trim means coupled to each fuel control effective to modify the power setting of the fuel control, governing means including means responsive to a load speed command signal, means responsive to load speed, and means responsive to the load speed error coupled to the power trim means of all engines so as to reset the fuel controls in the direction to eliminate the load speed error, digital up/down counter means having an input and an output, digital-to-analog conversion means having an input to receive the output of said digital counter means and means to convert the output of said digital counter means into an analog electrical signal for transmission to the power trim means, means effective to load the counter means to a predetermined set count when the fuel control is initially energized, beeper means effective to vary the power trim means of the engine over a preset range from a nominal rated speed, said beeper means including second means settable by an operator including a normally open switch having a speed increase and a speed decrease position, auxiliary beeper means for each engine effective to vary the power trim means of each of the engines over a preset range from a nominal rated speed including third means settable by an operator, said third means settable by an operator including a normally open switch having a speed increase and a speed decrease position so as to vary the division of load between the engines, means including first logic means having gates operable in response to positioning of said second and third means settable by the operator in speed increase or decrease positions to send increase and decrease electrical pulse signals to the input of the preset counter means, and second logic means receiving signals from the output of said counter means prior to passage thereof to the input of said conversion means, said second logic means having gates responsive to critical digits in the counter and effective to condition said first logic means to block transmission of signals from said first logic means to the input of said counter means at preset minimum and maximum count levels at the output of said counter means.

3. A control system for a power plant including a plural number of combustion engines connected to drive a common load comprising in combination, a fuel control for each engine operative to control fuel flow to the respective engine, first means settable by an operator effective to vary the power setting of said fuel controls, power trim means coupled to each fuel control effective to modify the power setting of the fuel control, governing means including means responsive to a load speed command signal, means responsive to load speed, and means responsive to the load speed error coupled to the power trim means of all engines so as to reset the fuel controls in the direction to eliminate the load speed error, digital up/down counter means having an input and an output, digital-to-analog conversion means having an input to receive the output of said digital counter means and means to convert the output of said digital counter means into an analog electrical signal for transmission to the power trim means, means effective to load the counter means to a predetermined set count when the fuel control is initially energized, beeper means effective to vary the power trim means of the engine over a preset range from a nominal rated speed, said beeper means including second means settable by an operator including a normally open switch having a speed increase and a speed decrease position, means including first logic means having gates operable in response to positioning of said switch in speed increase or decrease positions to send increase and decrease electrical pulse signals to the input of the preset counter means, and second logic means receiving signals from the output of said counter means prior to passage thereof to the input of said conversion means, said second logic means having gates responsive to critical digits in the counter and effective to condition said first logic mmeans to block transmission of signals from said first logic means to the input of said counter means at preset minimum and maximum count levels at the output of said counter means.

4. A control system for a power plant including a plural number of combustion engines connected to drive a common load comprising, in combination, a fuel control for each engine operative to control fuel flow to the respective engine, first means settable by an operator effective to vary the power setting of said fuel controls, power trim means coupled to each fuel control effective to modify the power setting of the fuel control, load sharing means responsive to a condition indicative of the power output of each engine normally coupled to the power trim means of the respective engine so as to increase the power output of each engine other than that generating the highest power, and optionally operable means effective to disable the load sharing means, digital up/down counter means having an input and an output, digital-to-analog conversion means having an input to receive the output of said digital counter means and means to convert the output of said digital counter means into an analog electrical signal for transmission to the power trim means, means effective to load the counter means to a predetermined set count when the fuel control is initially energized, beeper means effective to vary the power trim means of the engine over a preset range from a nominal rated speed, said beeper means including second means settable by an operator including a normally open switch having a speed increase and a speed decrease position, means including first logic means having gates operable in response to positioning of said switch in speed increase or decrease positions to send increase and decrease electrical pulse signals to the input of the preset counter means, and second logic means receiving signals from the output of said counter means prior to passage thereof to the input of said conversion means, said second logic means having gates responsive to critical digits in the counter and effective to condition said first logic means to block transmission of signals from said first logic means to the input of said counter means at preset minimum and maximum count levels at the output of said counter means and means effective to hold the counter means at the set count when the load sharing means is operative.

5. A control system for a power plant including a plural number of combustion engines connected to drive a common load comprising, in combination, a fuel control for each engine operative to control fuel flow to the respective engine, first means settable by an operator effective to vary the power setting of said fuel controls, power trim means coupled to each fuel control effective to modify the power setting of the fuel control, load sharing means responsive to a condition indicative of the power output of each engine normally coupled to the power trim means of the respective engine so as to increase the power output of each engine other than that generating the highest power, and optionally operable means effective to disable the load sharing means, governing means including means responsive to a load speed command signal, means responsive to load speed, and means responsive to the load speed error coupled to the power trim means of all engines so as to reset the fuel controls in the direction to eliminate the load speed error, digital up/down counter means having an input and an output, digital-to-analog conversion means having an input to receive the output of said digital counter means and means to convert the output of said digital counter means into an analog electrical signal for transmission to the power trim means, means effective to load the counter means to a predetermined set count when the fuel control is initially energized, beeper means effective to vary the power trim means of the engine over a preset range from a nominal rated speed, said beeper means including second means settable by an operator including a normally open switch having a speed increase and a speed decrease position, auxiliary beeper means for each engine effective to vary the power trim means of each of the engines over a preset range from a nominal rated speed including third means settable by an operator, said third means settable by an operator including a normally open switch having a speed increase and a speed decrease position so as to vary the division of load between the engines, means zeroizing the output of the auxiliary beeper means when the load sharing means is operative, means including first logic means having gates operable in response to positioning of said second and third means settable by the operator in speed increase or decrease positions to send increase and decrease electrical pulse signals to the input of the preset counter means, and second logic means receiving signals from the output of said counter means prior to passage thereof to the input of said conversion means, said second logic means having gates responsive to critical digits in the counter and effective to condition said first logic means to block transmission of signals from said first logic means to the input of said counter means at preset minimum and maximum count levels at the output of said counter means.

* * * * *